United States Patent
Chugunov et al.

(10) Patent No.: US 12,291,964 B2
(45) Date of Patent: *May 6, 2025

(54) METHOD FOR REAL-TIME INTERPRETATION OF PRESSURE TRANSIENT TEST

(71) Applicant: Schlumberger Technology Corporation, Sugar Land, TX (US)

(72) Inventors: Nikita Chugunov, Arlington, MA (US); Sukru Sarac, Al-Khobar (SA); Kirsty Morton, Cambridge, MA (US); Fikri Kuchuk, Cambridge, MA (US); Terizhandur S. Ramakrishnan, Boxborough, MA (US); Stephane Vannuffelen, Cambridge, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,532

(22) Filed: May 24, 2023

(65) Prior Publication Data

US 2023/0279774 A1   Sep. 7, 2023

Related U.S. Application Data

(63) Continuation of application No. 16/034,386, filed on Jul. 13, 2018, now Pat. No. 11,603,740.
(Continued)

(51) Int. Cl.
*E21B 49/00* (2006.01)
*E21B 41/00* (2006.01)
*E21B 47/06* (2012.01)

(52) U.S. Cl.
CPC ............ *E21B 49/008* (2013.01); *E21B 41/00* (2013.01); *E21B 47/06* (2013.01); *E21B 49/005* (2013.01); *G01V 2210/624* (2013.01)

(58) Field of Classification Search
CPC ........ E21B 49/008; E21B 41/00; E21B 47/06; E21B 49/005; G01V 2210/624
See application file for complete search history.

(56) References Cited

U.S. PATENT DOCUMENTS 9,416,656 B2   8/2016   Pomerantz et al.
10,161,243 B2   12/2018   Franklin et al.
(Continued)

FOREIGN PATENT DOCUMENTS

WO   2004079144 A3   2/2006
WO   2007055794 A2   5/2007
(Continued)

OTHER PUBLICATIONS

Renzo Angeles et al.; "Estimation of capillary pressure and relative permeability from formation-tester measurements using Design of Experiment and data-weighing inversion: Synthetic and field examples"; Journal of Petroleum Science and Engineering 75 (2010) 19-32 (Year: 2010).*
(Continued)

*Primary Examiner* — Rehana Perveen
*Assistant Examiner* — Nupur Debnath
(74) *Attorney, Agent, or Firm* — Trevor G. Grove; Jeffrey D. Frantz

(57) ABSTRACT

Methods for interpreting pressure transient tests and predicting future production for a well are provided. In one embodiment, a method for predicting future production includes beginning a pressure transient test within a well at a wellsite and obtaining pressure measurements of well fluid during the pressure transient test. The method can also
(Continued)

include using the obtained pressure measurements to determine probabilistic estimates of input parameters of a pressure transient reservoir model while continuing the pressure transient test. Future production from the well can then be estimated based on the probabilistic estimates of the input parameters. Other methods and systems are also disclosed.

15 Claims, 12 Drawing Sheets

Related U.S. Application Data

(60) Provisional application No. 62/532,063, filed on Jul. 13, 2017.

(56) References Cited

U.S. PATENT DOCUMENTS

| | | | |
|---|---|---|---|
| 10,718,186 | B2 | 7/2020 | Sayarpour et al. |
| 11,603,740 | B2 | 3/2023 | Chugunov et al. |
| 2011/0246161 | A1 | 10/2011 | Morton et al. |
| 2012/0215512 | A1 | 8/2012 | Sarma |
| 2013/0116998 | A1 | 5/2013 | Shirzadi et al. |
| 2015/0159484 | A1 | 6/2015 | Dumont et al. |
| 2015/0247940 | A1 | 9/2015 | de Matos Ravanelli et al. |
| 2015/0355374 | A1* | 12/2015 | Morton .............. G01V 1/50 703/10 |
| 2016/0010444 | A1 | 1/2016 | AlQahtani et al. |
| 2016/0116638 | A1 | 4/2016 | Kuchuk et al. |
| 2016/0153266 | A1 | 6/2016 | Rashid et al. |
| 2016/0208599 | A1* | 7/2016 | Rahman ............ E21B 47/005 |
| 2016/0281494 | A1* | 9/2016 | Shirdel ............. E21B 33/12 |
| 2017/0081957 | A1* | 3/2017 | O'Reilly ........... E21B 43/127 |
| 2017/0145793 | A1 | 5/2017 | Ouenes |

FOREIGN PATENT DOCUMENTS

| | | |
|---|---|---|
| WO | 2012027020 A1 | 3/2012 |
| WO | 2017079179 A1 | 5/2017 |

OTHER PUBLICATIONS

A case study from Schlumberger; "Signature Gauges Enabled by Muzic Wireless Telemetry obtain Real-Time Data from Lower Completion", (Year: 2015).
Biryukov, et al., "Transient Pressure Behavior of Reservoirs with Discrete Conductive Faults and Fractures", Transport in Porous Media, 2012, 95(1), pp. 239-268.
Booth et al., "Grid-Based Inversion of Pressure Transient Test Data With Stochastic Gradient Techniques", International Journal for Uncertainty Quantification, 2 (4), 2012, pp. 323-339.
Chugunov, N. et al., "Method for Adaptive Optimization of EOR Performance Under Uncertainty", SPE-173295-MS, SPE Reservoir Simulation Symposium, 2015.
Combined Search and Examination Report issued in the related GB application 1811524.6 dated Dec. 21, 2018, 7 pages.
Cox, J. S., "The Development of an Artificial Neural Network as Pressure Transient Analysis Tool with Applications in Multi-Lateral Wells in Tight-Gas Dual-Porosity", A Thesis in Energy and Mineral Engineering, 2014.
Hollaender, F. et al., "Real Time Well Testing: A Game Changer—Experience and Lessons Learned Over 100 Well Tests Performed In the North Sea", SPE-176808-MS; SPE (Society of Petroleum Engineering); Year: (2015).
Kristensen, M., et al., "Fast Proxy Models for Probabilistic Evaluation of Downhole Fluid Sampling Operations", ECMOR XV, Aug. 29-Sep. 1, 2016, Amsterdam, Netherlands, 17 pages.
Kuchuk, F. J., "Radius of Investigation for Reserve Estimation from Pressure Transient Well Tests", 120515-MS, Presented at the SPE Middle East Oil and Gas Show and Conference, Manama, Bahrain, 2009, 21 pages.
Martinelli, G. et al., "Sensitivity Analysis with Correlated Inputs for Volumetric Analysis of Hydrocarbon Prospects", ECMOR-XIV, Catania, Sicily, Italy, 2014, 15 pages.
Morton, K. L. et al., "Global Sensitivity Analysis for Natural Fracture Geological Modeling Parameters from Pressure Transient Testa", EAGE Annual Conference & Exhibition, 2013.
Oladyshkin, S. et al., "Polynomial Response Surfaces fror Probabilistic Risk Assessment and Risk Control via Robust Design", SRC Simulation Technology, Institute of Hydraulic Engineering, 2014.
Oldenburg, C. M. et al., "Preliminary Simulations of Carbon Dioxide Injection and Geophysical Monitoring to Improve Imaging and Characterization of Faults and Fractures at EGS Sites", Proceedings of the 41st Workshop on Geothermal Reservoir Engineering, 2016.
Pajonk, O. et al., "Evaluation of Non-intrusive Generalized Polynomial Chaos Expansion in the Context of Reservoir Simulation", 14th European Conference on the Mathematics of Oil Recovery, 2014.
Rajabi, M. M. et al., "Polynomial chaos expansions for uncertainty propagation and moment independent sensitivity analysis of seawater intrusion simulations", journal homepage: www.elsevier.com/locate/jhydrol, 2014.
Saltelli, A., et al., "Global Sensitivity Analysis: The Primer", Wiley-Interscience, 2008, 305 pages.
Sudret, B., "Global sensitivity analysis using polynomial chaos expansion", Reliability Engineering & System Safety, 2008,93(7), pp. 964-979 2008.

\* cited by examiner

METHOD FOR REAL-TIME INTERPRETATION OF PRESSURE TRANSIENT TEST

CROSS-REFERENCE TO RELATED APPLICATION

This application is a continuation application of U.S. patent application Ser. No. 16/034,386, filed on Jul. 13, 2018, which claims the benefit of U.S. Provisional Patent Appl. No. 62/532,063, filed on Jul. 13, 2017, the entirety of the foregoing applications are incorporated herein by reference.

BACKGROUND

Field

This disclosure relates to methods and systems for well testing, and more particularly to a system and method for well test interpretation and a combination of analysis techniques with predictive models.

Description of the Related Art

Wells are generally drilled into subsurface rocks to access fluids, such as hydrocarbons, stored in subterranean formations. The subterranean fluids can be produced from these wells through known techniques. Operators may want to know certain characteristics of subterranean formations penetrated by wells to facilitate efficient and economic exploration and production. For example, operators may perform a pressure transient test of the well and use the resulting pressure transient data to evaluate formation size, boundaries, shape, and permeability, among other characteristics. A model can be used to estimate various reservoir parameters from the measured pressure transient data. For example, the Warren and Root dual-porosity model can be used for certain reservoirs. When the underlying model is based on full-scale reservoir simulation, the associated inversion workflow can be prohibitively computationally expensive.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment of the present disclosure, a method for predicting future production from a well includes beginning a pressure transient test within the well and obtaining pressure measurements of well fluid during the pressure transient test. The method also includes using the obtained pressure measurements to determine, through inversion and while continuing the pressure transient test, probabilistic estimates of input parameters of a pressure transient reservoir model. Future production from the well is then estimated based on the probabilistic estimates of the input parameters of the pressure transient reservoir model.

In another embodiment, a method includes defining uncertain input parameters of a pressure transient reservoir model and a production prediction reservoir model and defining probability distributions for the uncertain input parameters. The method also includes generating forward realizations of the pressure transient reservoir model and of the production prediction reservoir model, quantifying contributions of uncertainty in the input parameters to uncertainty in a pressure transient response output of the pressure transient reservoir model, and quantifying contributions of uncertainty in the input parameters to uncertainty in a predicted production output of the production prediction reservoir model. The quantified contributions of uncertainty in the input parameters to uncertainty in the pressure transient response output may be compared with the quantified contributions of uncertainty in the input parameters to uncertainty in the predicted production output. The method also includes refining a pressure transient test to be performed within a well at a wellsite based on this comparison, and then performing the refined pressure transient test within the well at the wellsite.

In another embodiment of the present disclosure, an apparatus includes a data acquisition system and a data analysis system. The data acquisition system is connected to well equipment to acquire downhole pressure data during a pressure transient test within a well at a wellsite. Further, the data analysis system is programmed to predict, during the pressure transient test within the well, future production from the well by using the acquired downhole pressure data to determine probabilistic estimates of input parameters of a pressure transient reservoir model and estimating future production from the well based on the probabilistic estimates of the input parameters.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

Certain embodiments of the disclosure will hereafter be described with reference to the drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

DETAILED DESCRIPTION

In the following description, numerous details are set forth to provide an understanding of the present disclosure. It will be understood by those skilled in the art, however, that the embodiments of the present disclosure may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the disclosure.

Some embodiments of the present disclosure include systems and methods for monitoring and controlling conventional and unconventional wells, pipes, or streams during oil and gas exploration and production. A properly designed pressure transient test may enable evaluation of various reservoir parameters from pressure and rate data. A method for design of pressure transient well tests may be based on Global Sensitivity Analysis (GSA). By way of example, U.S. patent application Ser. No. 14/762,787, published as U.S. Patent Pub. No. 2015/0355374 and assigned to Schlumberger Technology Corporation, discloses a method for design of a well test based on Global Sensitivity Analysis (GSA). One of the computationally efficient approaches in performing GSA is based on polynomial chaos expansion (PCE). PCE involves constructing an approximation of the underlying computationally expensive reservoir model using orthogonal polynomial basis of a particular kind. Constructing this PCE approximation is a step in performing PCE-GSA, and this approximation (PCE-proxy) can be used in the probabilistic inversion workflows in a computationally efficient way to progressively update formation properties estimates as pressure transient data is being acquired during the test. Also disclosed herein is a workflow to design and perform a production-targeted well test by combining pressure transient and production prediction models in GSA-based analysis and PCE-proxy inversion.

Figure 1:
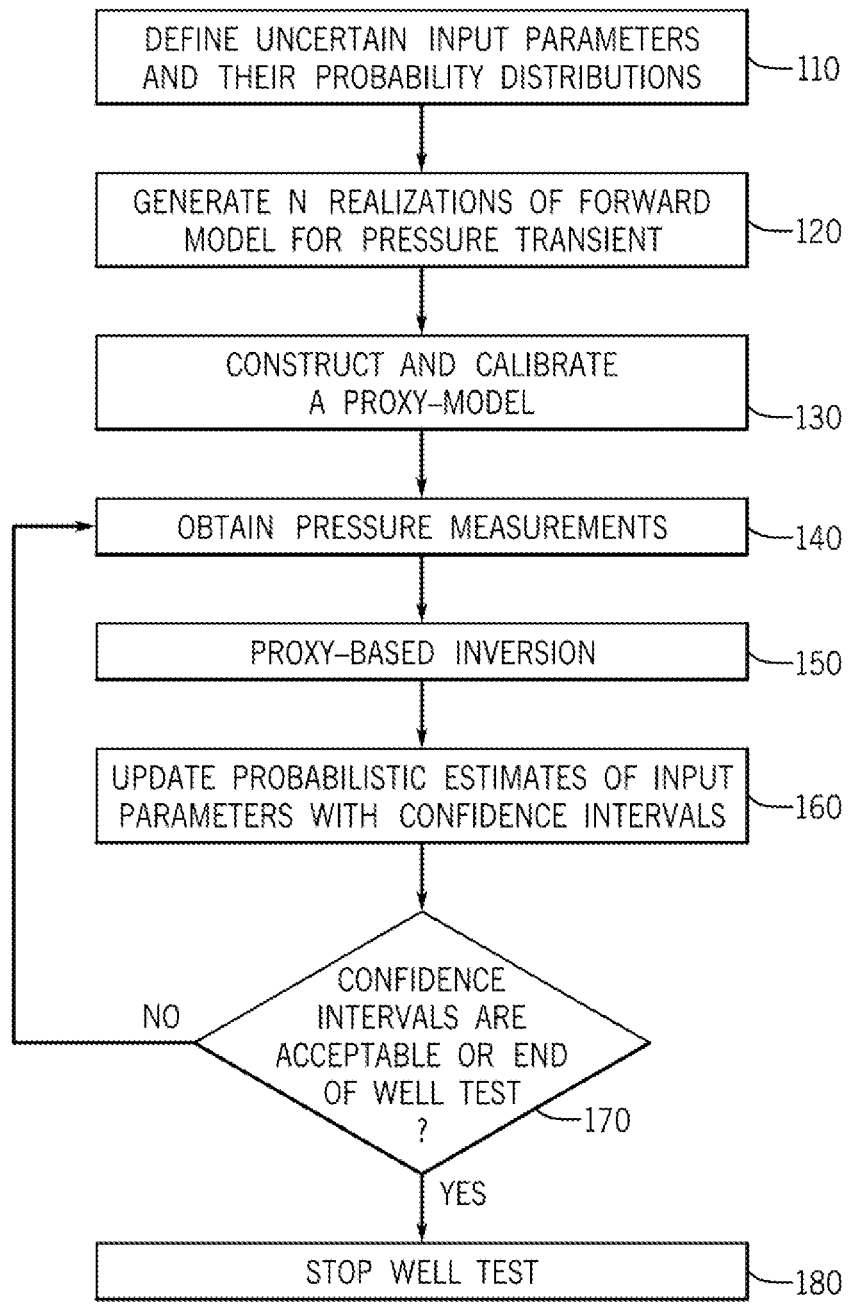
FIG. 1 shows a flowchart for a proxy-based inversion workflow.

This present disclosure includes an inversion workflow, shown in FIG. 1. Step 110 involves defining uncertain input parameters and their prior probability distributions. In a general case, a joint probability distribution function (PDF) is defined to capture dependencies and correlations among input parameters. Next, at step 120, N multiple realizations of the forward pressure transient models are generated based on the joint PDF defined in step 110. The magnitude of N depends on the chosen sampling scheme and the type of a proxy-model to be used for inversion in subsequent steps. Sampling of the joint PDF can be based on traditional Monte-Carlo methods. Other methods including Latin Hypercube Sampling and Quasi Monte-Carlo sampling (e.g. LPT sequence) may be employed for computational efficiency. Forward modeling may be based on analytical or semi-analytical solutions described in our previous disclosure, U.S. Patent Pub. No. 2015/0355374, or using a full-scale reservoir simulation model where the subsurface is discretized into a numerical grid (typically tens to hundreds of thousands of grid-cells) and pressure transient solution is obtained based as a solution to governing equations. At the end of step 120, N pressure transient responses are generated corresponding to the sampled joint PDF of input parameters defined in step 110.

Figure 2:
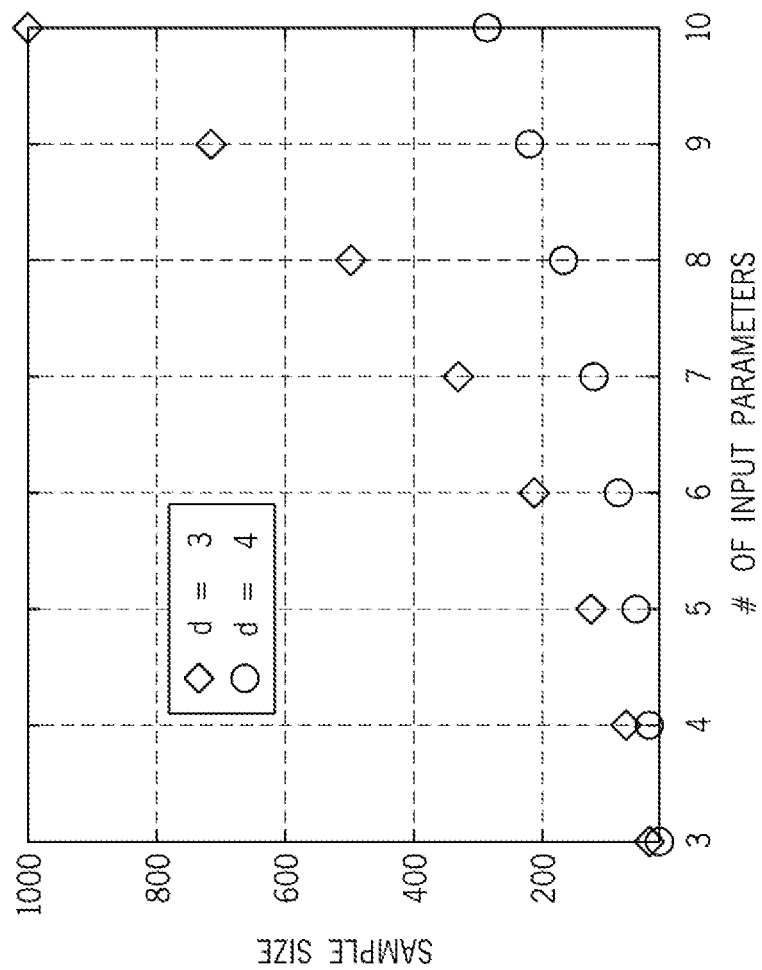
FIG. 2 shows a graph of the lower estimate for a number of model calls (sample size) to construct a PCE-proxy using polynomials of degree 3 and degree 4.

As disclosed in U.S. Patent Pub. No. 2015/0355374, which is incorporated herein by reference in its entirety, the results of steps 110-120 can be used to perform GSA for quantifying individual parameter contributions to the uncertainty of pressure transient response. In an embodiment, GSA indices are computed using PCE. This approach may be implemented in GeoTesting, a geology-based well-test design and interpretation services software developed by Schlumberger. PCE constructs an approximation of the predicted pressure transient responses via orthogonal projection of the original function onto the orthogonal polynomial basis in the space of polynomials of a particular family (e.g., Hermite, Jacobi, Laguerre, and Legendre) and degree. The computational cost of PCE-based GSA is substantially lower than that for Monte-Carlo-based GSA. The lower bound for the number of model evaluations required for PCE is $$N=(d+k)!/(d!k!), \qquad (1)$$

where d is a degree of polynomial and k is a number of uncertain model input parameters. The estimate for the required sample size is shown in FIG. 2.

Once the PCE-proxy is constructed at step 130, GSA indices can be computed directly based on the coefficients of the PCE-proxy from the projection of the original model onto the orthogonal polynomial basis functions. Using the values of GSA indices, a determination can be made for well-test design and duration, as disclosed in U.S. Patent Pub. No. 2015/0355374.

In the present application, a method for real-time pressure transient inversion using a proxy-model constructed based on steps 110-120 is disclosed. In one embodiment, the constructed proxy-model in step 130 is the PCE-proxy. In the general case, the joint PDF for the input parameters can be transformed into uncorrelated normal distributions, simplifying PCE-proxy model based on Hermite polynomials. If validation of the PCE-proxy produces unsatisfactory match with the physical model, additional model evaluations (beyond the lower bound provided by Eq. 1) can be used to increase the degree of polynomials in the PCE-proxy. In another embodiment, a kriging-based proxy-model can be constructed based on results obtained in step 120. An example of kriging-based proxy-model constructed and validated based on results of reservoir simulation is disclosed in "Fast Proxy Models for Probabilistic Evaluation of Downhole Fluid Sampling Operations," Kristensen M., Chugunov N., Ayan C., Lukyanov A. (2016), ECMOR XV. As an optional step, GSA results may be used to reduce the dimensionality of the proxy-model by excluding input parameters with negligible contributions to the uncertainty of pressure transient during the well test. In yet another embodiment, an analytical or semi-analytical model for pressure transient may be used (e.g., mesh-free semi-analytical model). In yet another embodiment, a wide range of machine learning methods such as neural networks can be used to construct a proxy-model for well-test response.

Pressure-transient test interpretation is sensitive to data noise in step 140. Therefore, signal-to-noise characteristics should be taken into account during the inversion step 150. This will enable computing of probabilistic estimates of the parameter values in step 160. The noise in the data is the sum of intrinsic gauge noise as well as the ambient noise from the wellbore or reservoir, especially due to events such as string movement, well-bore fluid segregation, or surface operations. Furthermore, contributions from different components vary during the test. For example, the beginning of a build-up period has higher noise levels compared to the later parts, because of well-bore storage accompanied by phase segregation. Diagnosis of noise characteristics may be inferred from hardware (pressure gauge) specifications and testing sequence, as well as statistical analysis of the measured data. Steps 140-160 are to be repeated as more pressure transient data is progressively obtained. The well test is stopped at any time if the confidence intervals for the input parameters of interest are deemed acceptable (step 170). It may also be stopped when the test time exceeds a pre-specified value. Then, if the confidence intervals are not satisfactory, an updated GSA plot is generated using the latest inversion results and the proxy model. This GSA plot shows the reduction in sensitivities for the parameter that have had an effect on the pressure transient behavior (by comparing it to the original GSA plot) and the parameter sensitivities for the continuation of the well test. Using this information, time to achieve confident inversion results for other parameters may be determined, thus providing a practical criterion for evaluating the value of continuing the test versus the cost of the time at the wellsite. The illustrative example below provides a detailed explanation for the inversion workflow shown in FIG. 1.

In the illustrative example, a reservoir model with four uncertain input parameters, denoted by keywords as given below:
  RATE: oil production rate.
  PERM: formation permeability.
  FAULT TRANS: fault transmissibility multiplier.
  DISTANCE: distance to the fault.

The probability distributions assigned to the four input parameters at step 110 are shown in Table 1. Rate is often measured and considered to be "known" during a well test as it is a key measurement. Any error in the measurement of flow-rate has a proportionate effect in a linearly diffusive pressure response. Therefore, there is a multiplicative shift in some of the results if this assumption is flawed. This is not the case for nonlinear models.

Each rate measurement method is subject to metrological limitations. In this example, rate uncertainty is considered to be consistent with measurement errors using a well-test separator. Typical values are chosen for permeability and fault uncertainty, while fault distance uncertainty is considered at levels consistent with seismic resolution.

TABLE 1

Probability distributions assigned to the four input parameters at step 110.

| Parameter | Units | Probability Distribution (mean: $\mu$, standard deviation: $\sigma$) |
|---|---|---|
| RATE | $m^3/d$ | Normal ($\mu = 1000$, $\sigma = 110$) |
| PERM | mD | Normal ($\mu = 200$ mD, $\sigma = 25$ mD) |
| FAULT TRANS | — | Uniform (min = 0, max = 0.5) |
| DISTANCE | m | Normal ($\mu = 200$ m, $\sigma = 25$ m) |

Provided below is a detailed description of the pressure transient inversion analysis. But it will be appreciated that the described inversion analysis can also or instead be done with the pressure derivative in full accordance with the present technique.

Figure 3:
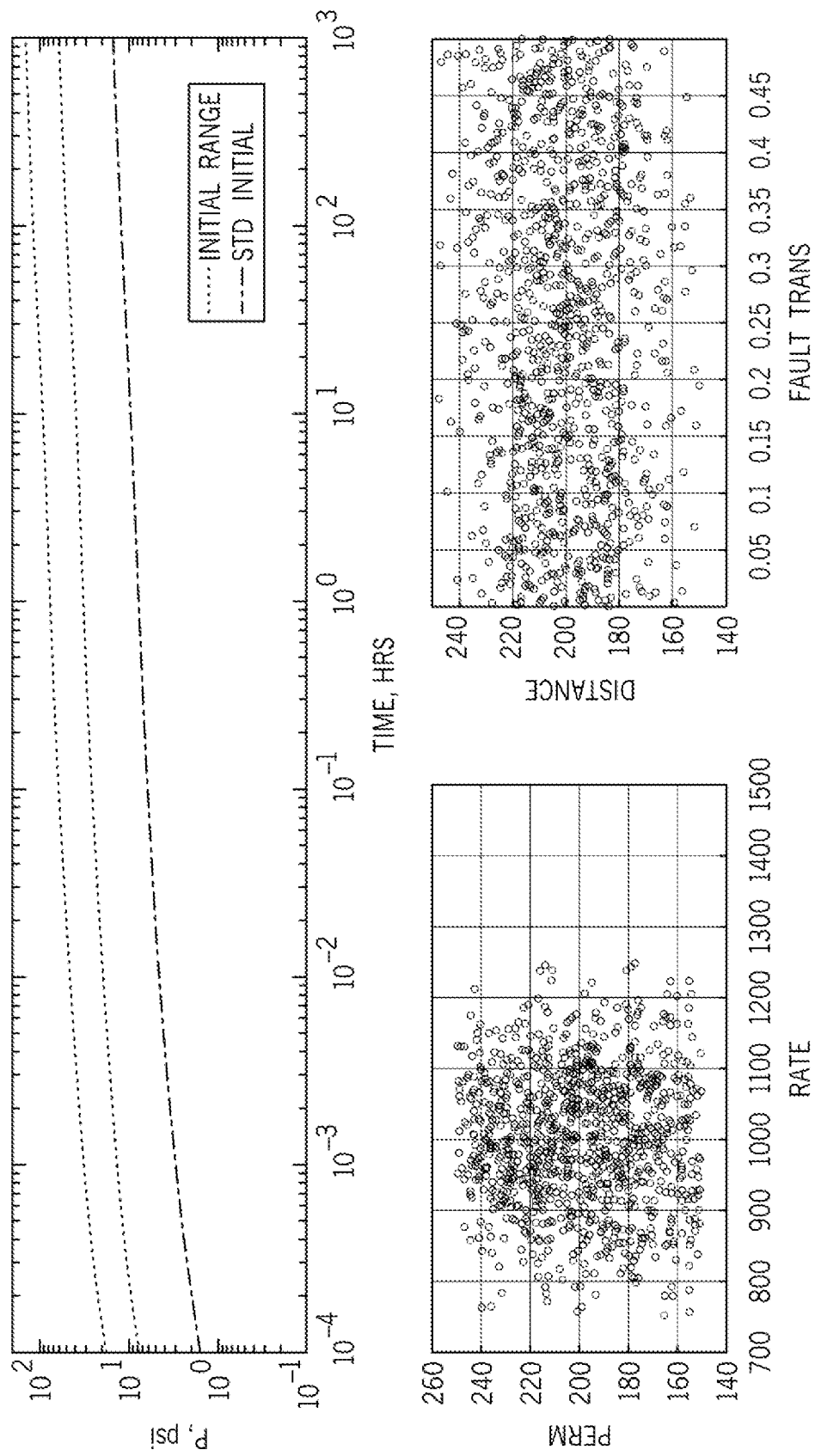
FIG. 3 shows graphs of initial predictions of delta pressure response ($F_{ref}$–P) and its standard deviation for a well test (top graph) given initial ranges of four input parameters (bottom graphs).

At step 120, equiprobable sampling was used to generate 1000 realizations of reservoir model based on the PDFs of input parameters defined in step 110. A semi-analytical simulator for fractured and faulted reservoirs was used to compute the pressure transient (delta pressure) and pressure derivative responses corresponding to 1000 realizations. The range of computed responses for the pressure transient is shown in FIG. 3 (top), which includes dotted lines representing the upper and lower bounds of the range of computed responses. Corresponding sampled values of the four input parameters are shown in FIG. 3 (bottom). The modeling of the delta pressure response and pressure derivative response can also or instead be done with another mathematical model and is not limited to the semi-analytical simulator described herein.

Figure 4:
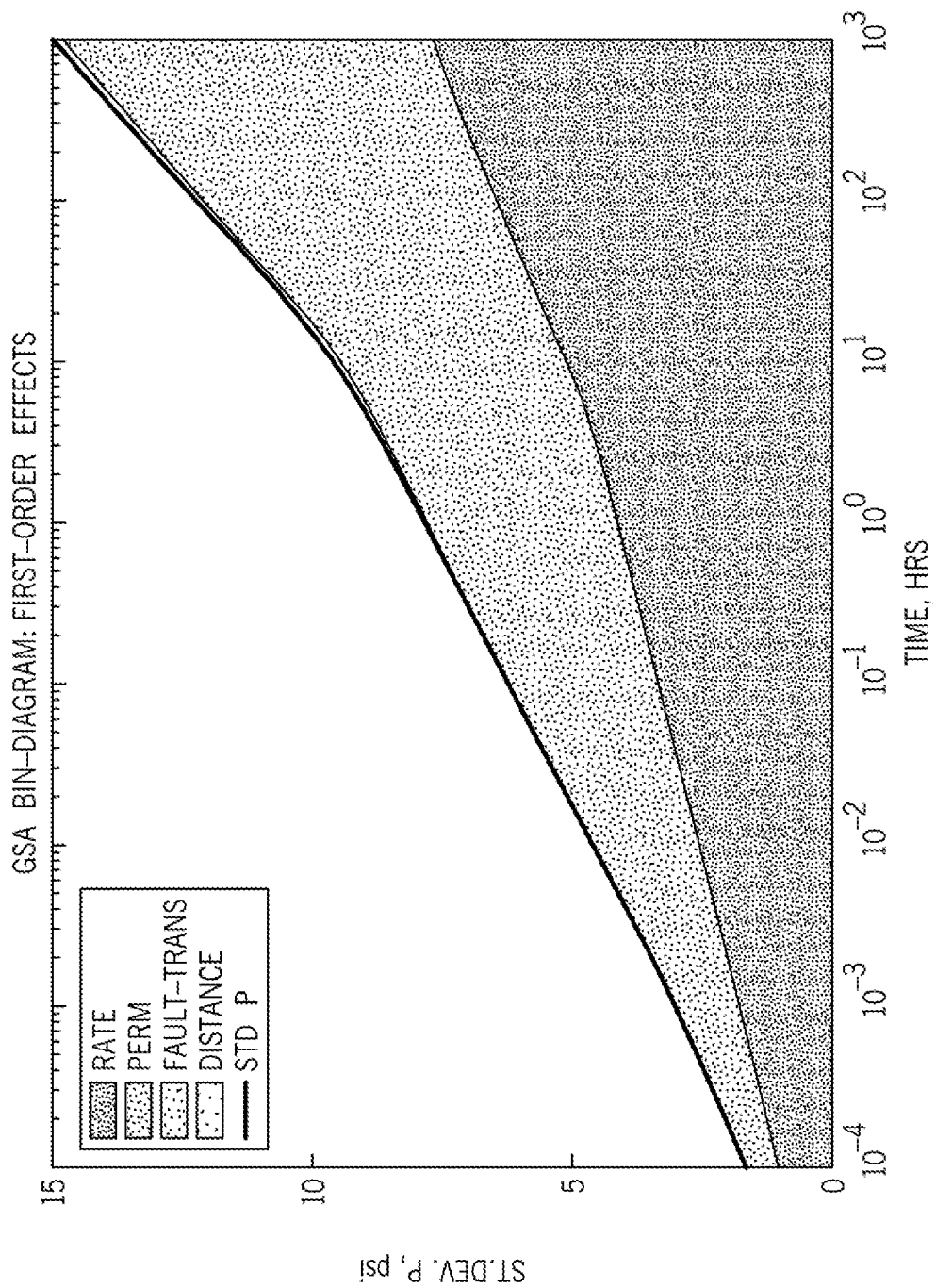
FIG. 4 shows a first-order GSA bin-diagram showing individual contributions (S1) from the input parameters to standard deviation of pressure transient.
Figure 5:
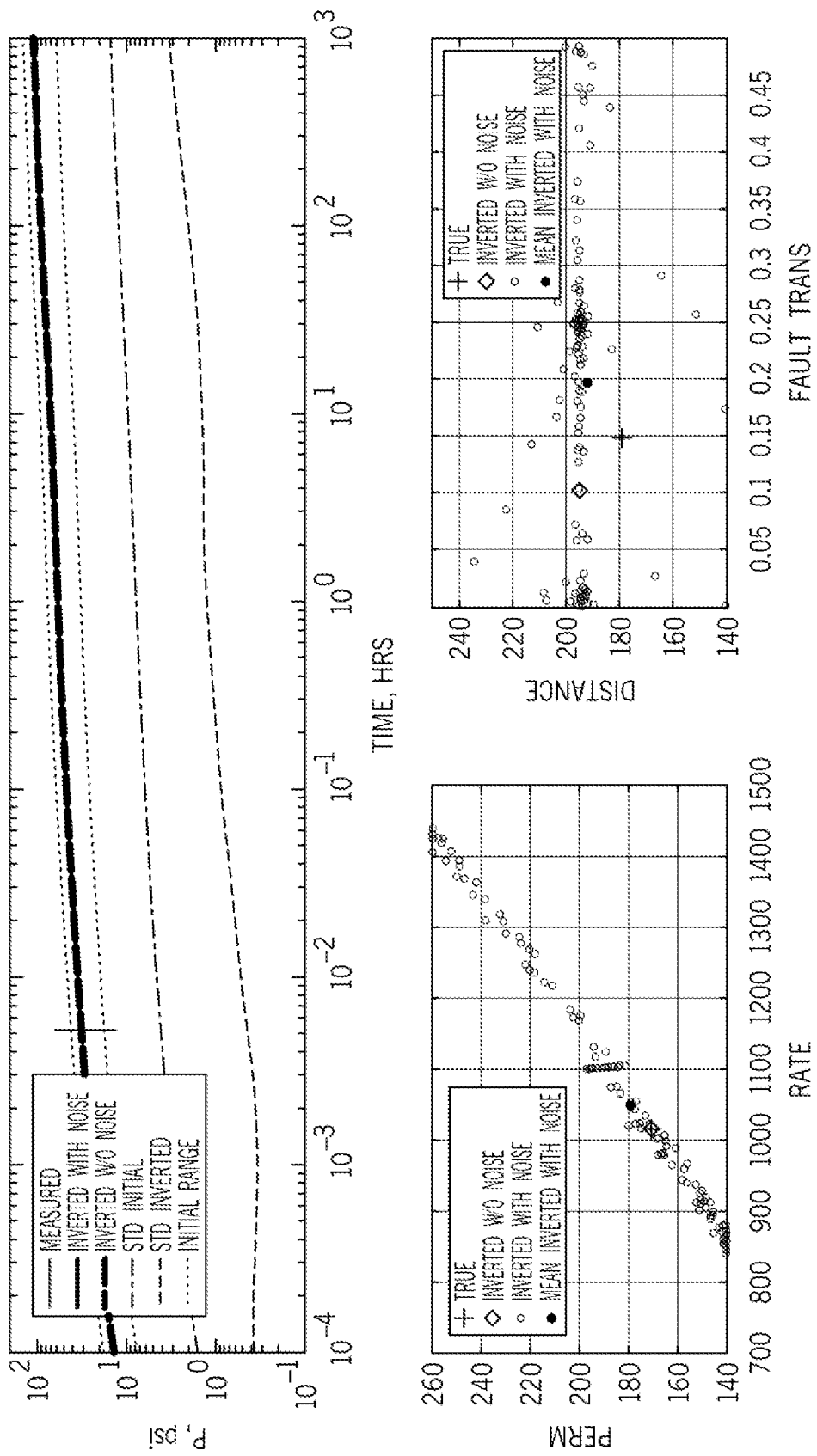
FIG. 5 shows pressure and standard deviation of predictions from proxy-based inversion using measured pressure data up to 20 s=0.0056 h (top graph) and inverted input parameter values (bottom graphs).
Figure 6:
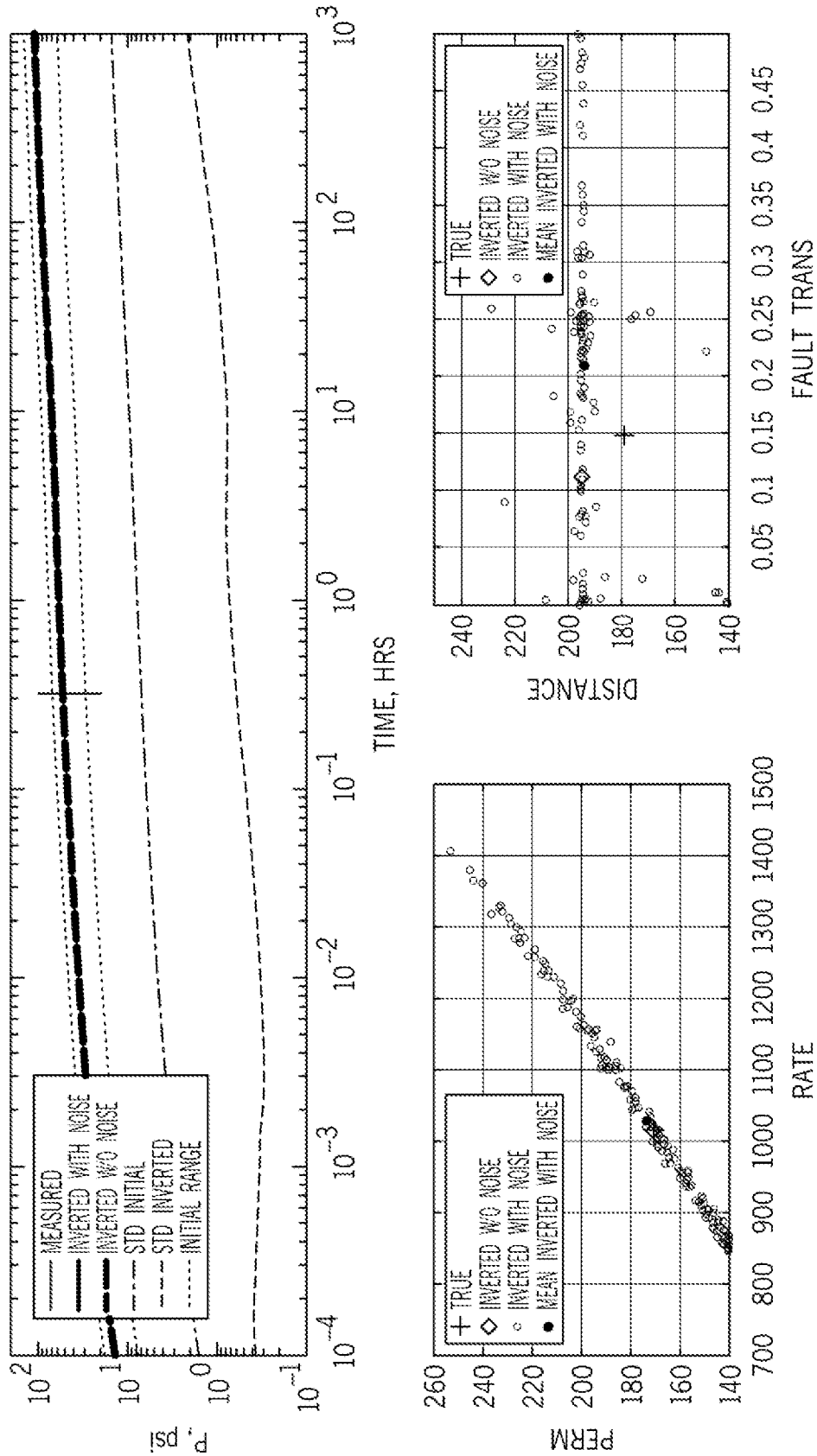
FIG. 6 shows pressure and standard deviation of predictions from proxy-based inversion using measured pressure data up to 0.32 hrs (top graph) and inverted input parameter values (bottom graphs).
Figure 7:
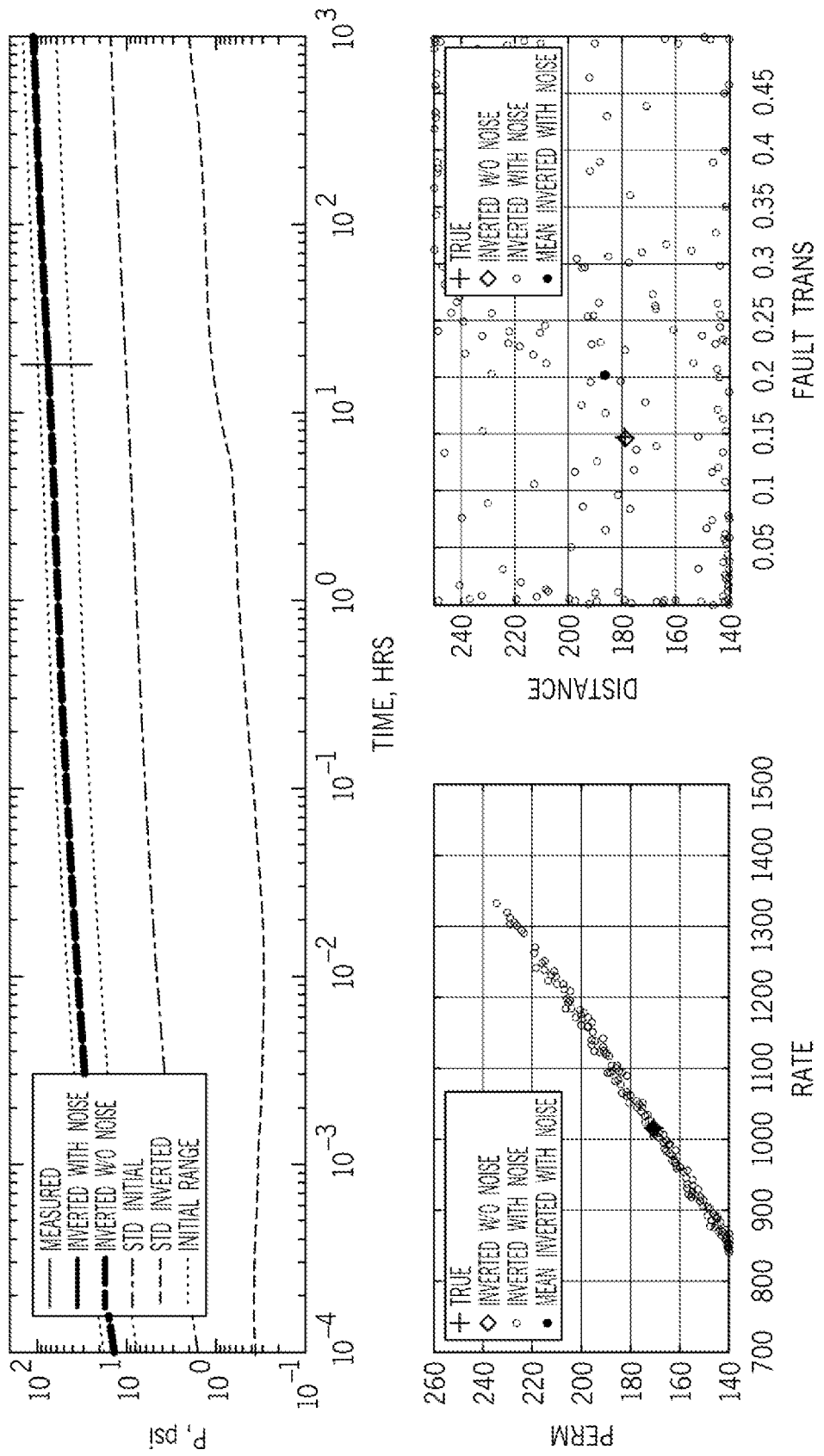
FIG. 7 shows pressure and standard deviation of predictions from proxy-based inversion using measured pressure data up to 17.78 hrs (top graph) and inverted input parameter values (bottom graphs).
Figure 8:
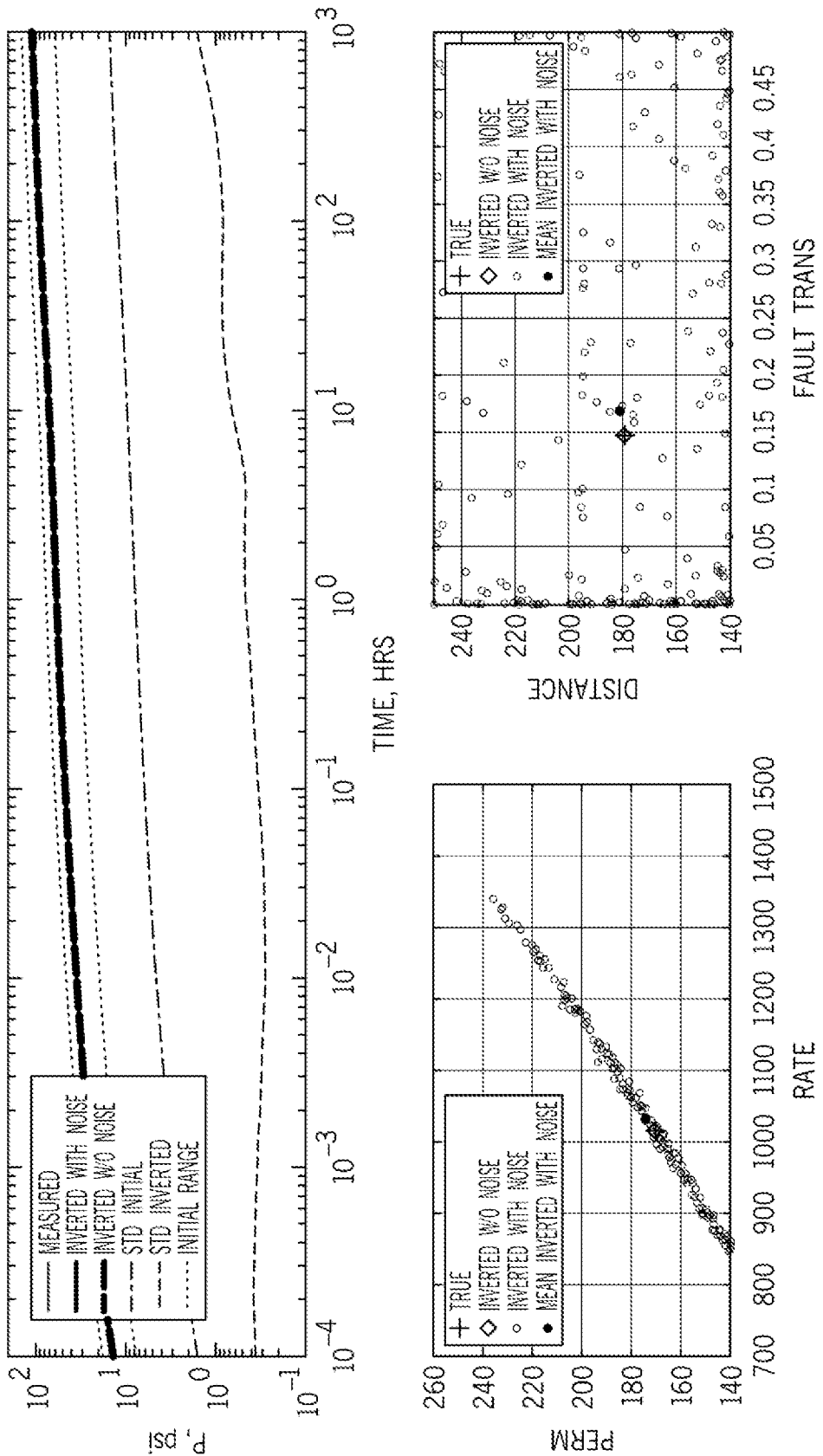
FIG. 8 shows pressure and standard deviation of predictions from proxy-based inversion using measured pressure data for an entire duration of the well test (1000 hrs) and inverted input parameter values (bottom graphs).

At step 130, a PCE-proxy using polynomials of degree four is constructed. The accuracy of the constructed PCE-proxy may be determined, such as from the Li norm of the approximation error for pressure transient ($|P_{proxy}-P|$). The mean approximation error in one example is below 0.001 psi. Results of GSA for the pressure transient are shown in FIG. 4 using a GSA bin-diagram, where the thicker black line indicates standard deviation of the predicted pressure transient, while the stippled bins correspond to individual parameter contributions to the uncertainty of pressure transient. Two observations are evident from FIG. 4. First, uncertainty in the pressure transient (characterized by standard deviation) increases from 2 to 15 psi during the well test. Second, the two main contributors to uncertainty of pressure transient are RATE and PERM (with almost equal contributions throughout the test).

To illustrate the disclosed workflow in a realistic setting, an assumption is made that one of the generated 1000 realizations of the reservoir model corresponds to a "true" set of input parameter values, as shown in Table 2 below. Furthermore, to amplify the effect of noise on pressure transient inversion, a constant level of noise at 5% is assumed throughout the well test. As part of this development, it is also possible to define different noise levels and statistical models at different time intervals throughout a well test. The uncertainty associated with measurement noise is captured by generating 200 realizations of noise at a predefined level (in this example, 5%), and applying these realizations to a pressure transient generated by "true" reservoir model. Therefore, 200 individual inversions are performed to quantify uncertainty in inverted reservoir parameters due to specified level of noise in the pressure data. In the considered example, a simplified noise model included sampling from a uniform distribution between 0.95 and 1.05 for each moment of time corresponding to the measurement, and applying this multiplication factor to the measured signal. It will be appreciated that, in an actual implementation of the present technique, a pressure transient test performed in a well at a wellsite can be used to measure data (e.g., the pressure transient and pressure derivative) for an actual reservoir, the resulting data set may have an apparent noise of 5%, and that this measured data can be used in the present workflow.

The disclosed approach can be used to provide real-time estimates of the input parameter values with associated uncertainties and confidence intervals as the well test progresses. The inversion can be performed using deterministic approaches (e.g., nonlinear least-squares method such as Levenberg-Marquardt), or probabilistic approaches such as Markov Chain Monte Carlo. Since the underlying model is approximated by a PCE-proxy, the computational cost of the approach is negligible and the desired estimates can be obtained and updated in real-time as pressure data are being progressively acquired in step 140. This point is illustrated by FIGS. 5-8 corresponding to inversion results performed at 20 s (0.0056 h), 0.32 h, 17.78 h, and 1000 h after the beginning of the well test.

The top panels in FIGS. 5-8 show the initial range of the predicted pressure transients and associated initial standard deviation (test design phase, step 120). The obtained pressure data available at each stage of the test (step 140) is indicated by the solid "Measured" line. The predicted ensemble of pressure transients based on inversion (step 150) with 200 realizations of the noise are represented by a single solid "Inverted with Noise" line, with the estimated standard deviation of the ensemble shown in a dashed black line ("STD Inverted"). A vertical break line in each of the top panels of FIGS. 5-8 show the end of the "Measured" line in these figures. Finally, for completeness, the best fit for pressure transient in a noiseless environment is also included as shown in the heavy dashed line ("Inverted w/o Noise") overlaying the "Measured" and "Inverted with Noise" lines. Analysis of top panels from FIGS. 5-8 clearly shows a progressive reduction in standard deviation of the inverted pressure transients as more data become available to be used in the inversion.

The bottom two panels in FIGS. 5-8 show corresponding estimates of four input parameters based on the inversion of the available pressure transient data as the well test progresses (step 160). The "true" values of the input parameters are indicated by plus signs. The spread of inverted parameter estimates due to noise realizations is indicated by open circles, with the mean value across 200 inverted estimates shown by a solid black circle. Again, for completeness, parameter estimates based on noise-free inversion (diamond) is shown. Analysis of the bottom panels across FIGS. 5-8 indicates a strong posterior correlation between RATE and PERM (revealed from early stages of the well test) and a relatively uniform spread in inverted estimates of FAULT TRANS and DISTANCE. Both observations may be expected based on predictions from GSA.

The results of the inversion corresponding to end of the well test are summarized in Table 2.

TABLE 2

Estimated parameter values based on inversion of pressure transient

| | RATE | PERM | FAULT_TRANS | DISTANCE |
|---|---|---|---|---|
| True | 1015.4 | 170.58 | 0.1485 | 178.96 |
| Inverted w/o noise | 1015.5 | 170.59 | 0.1484 | 178.98 |
| Mean inverted | 1038.0 | 175.05 | 0.2261 | 178.72 |

Again, the inversion analysis described above can also or instead be done with the pressure derivative. Results of such pressure derivative inversion corresponding to the entire well test duration are summarized in Table 3.

TABLE 3

Estimated parameter values based on inversion of pressure derivative

| | RATE | PERM | FAULT TRANS | DISTANCE |
|---|---|---|---|---|
| True | 1015.4 | 170.58 | 0.1485 | 178.96 |
| Inverted w/o noise | 1015.2 | 170.54 | 0.1486 | 178.93 |
| Mean inverted | 1054.2 | 177.37 | 0.1436 | 183.66 |

Comparing results from Table 2 and Table 3, the accuracy of the inversion for FAULT TRANS and its posterior uncertainty is improved for pressure derivative inversion. This can be partially explained by the fact that the same level of uniform noise (5%) was applied both to pressure transient and pressure derivative.

Other Applications of the Disclosed Method

Based on the disclosed approach, a joint inversion of pressure transient and pressure derivative can be undertaken using steps 110 through 180 in FIG. 1. If a particular reservoir input parameter is of interest, the relative weighting of pressure transient and pressure derivative misfit in the objective function can be controlled by the value of first-order GSA index (S1) for the parameter of interest. Note that the S1 value will vary during the well test (see FIG. 4) enabling variable weighting of the misfit in the objective function to "amplify" contributions from the measurements during the portions of the well test when the measured data is sensitive to the parameter of interest.

Figure 9:
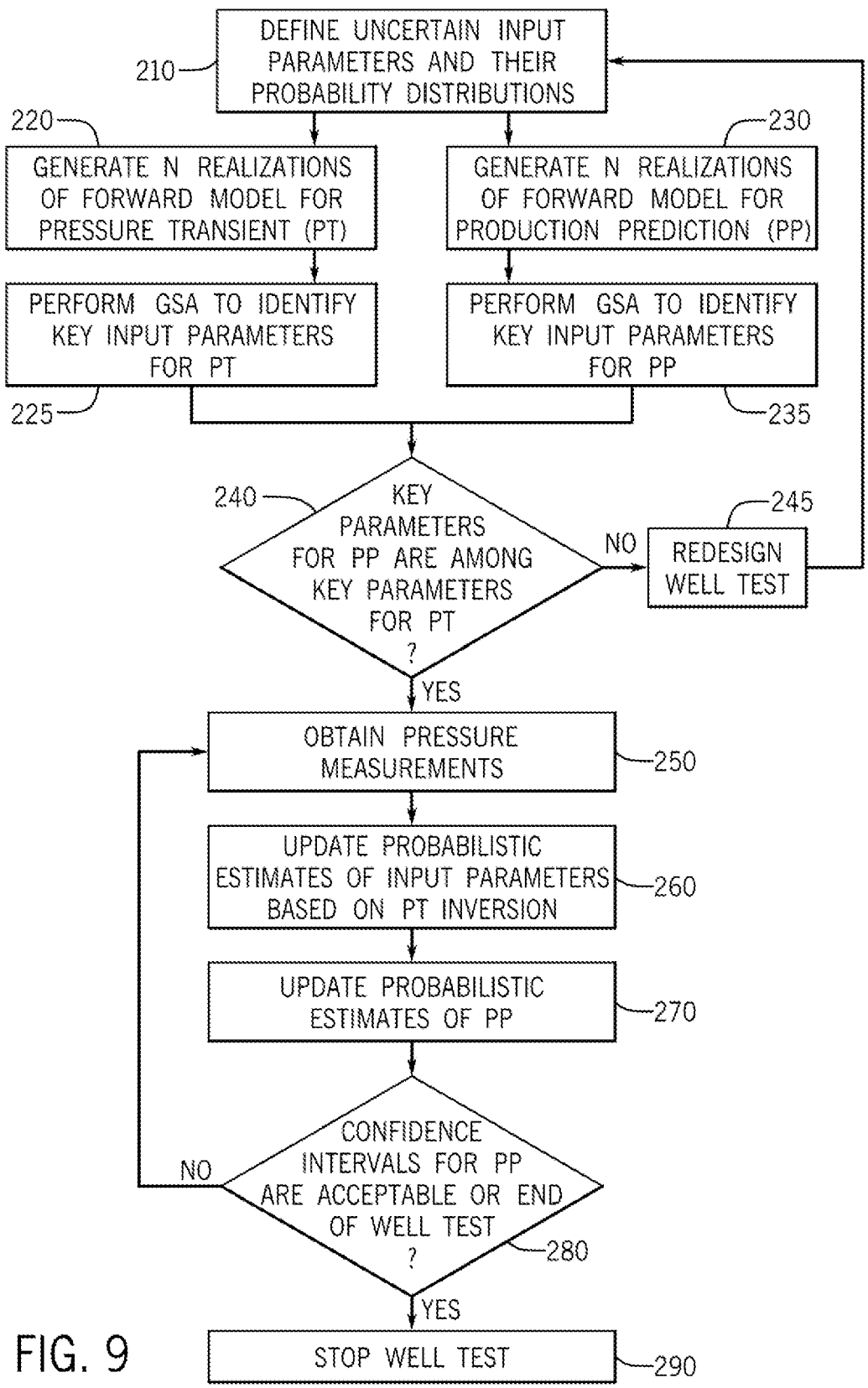
FIG. 9 shows a flowchart for designing and performing a production targeted well test.

The disclosed approach can also be used to design and perform a production targeted well test using a workflow provided in FIG. 9:

Steps 210 and 220 are the same as Steps 110 and 120 in FIG. 1.

Step 225: GSA is performed to quantify individual contributions to the uncertainty of the pressure transient (PT) from input parameters and identify parameters with highest contributions (as disclosed in U.S. Patent Pub. No. 2015/0355374). In one embodiment, GSA is based on PCE and, therefore, PCE-proxy for PT is readily available at this step.

Step 230: A reservoir model with the same input parameters identified in step 210 is used to compute predictions of hydrocarbon production for a reservoir (based on the sampled values of input parameters at step 210).

Step 235: GSA is performed to quantify individual contributions to the uncertainty of the predicted production (PP) from input parameters and identify parameters with highest contributions. In one embodiment, GSA is based on PCE and, therefore, PCE-proxy for PP is readily available at this step.

Step 240: Determination is made as to whether key parameters identified at Step 235 are among parameters identified at Step 225 (i.e., can be reliably inverted from the pressure transient and/or pressure derivative). If this is not the case, the well test can be redesigned at Step 245.

Steps 250-260: While progressively obtaining pressure transient data during well test (Step 250), perform PT proxy-based inversion to update posterior distributions of input parameter estimates (Step 260).

Step 270: Use inverted parameter estimates as inputs in PP reservoir model (constructed at Step 230) or PP proxy-model (constructed at Step 235) to estimate predicted production.

Steps 280-290: The well test can be terminated once the uncertainty in the predicted production estimates is reduced below a predefined threshold value. In some embodiments, Steps 225-240 can be repeated to perform GSA with updated posterior distributions of the input parameters obtained at Step 260 to quantitatively determine if continuing the well test would provide improved estimate (i.e., with reduced uncertainty) of the input parameters contributing to the uncertainty in the predicted hydrocarbon production from the reservoir. Decision on whether to stop the well test or, if necessary, modify the well test can be made based on results of these steps.

Implementation of Real-Time GSA in the Context of Well-Test Operations

Figure 10:
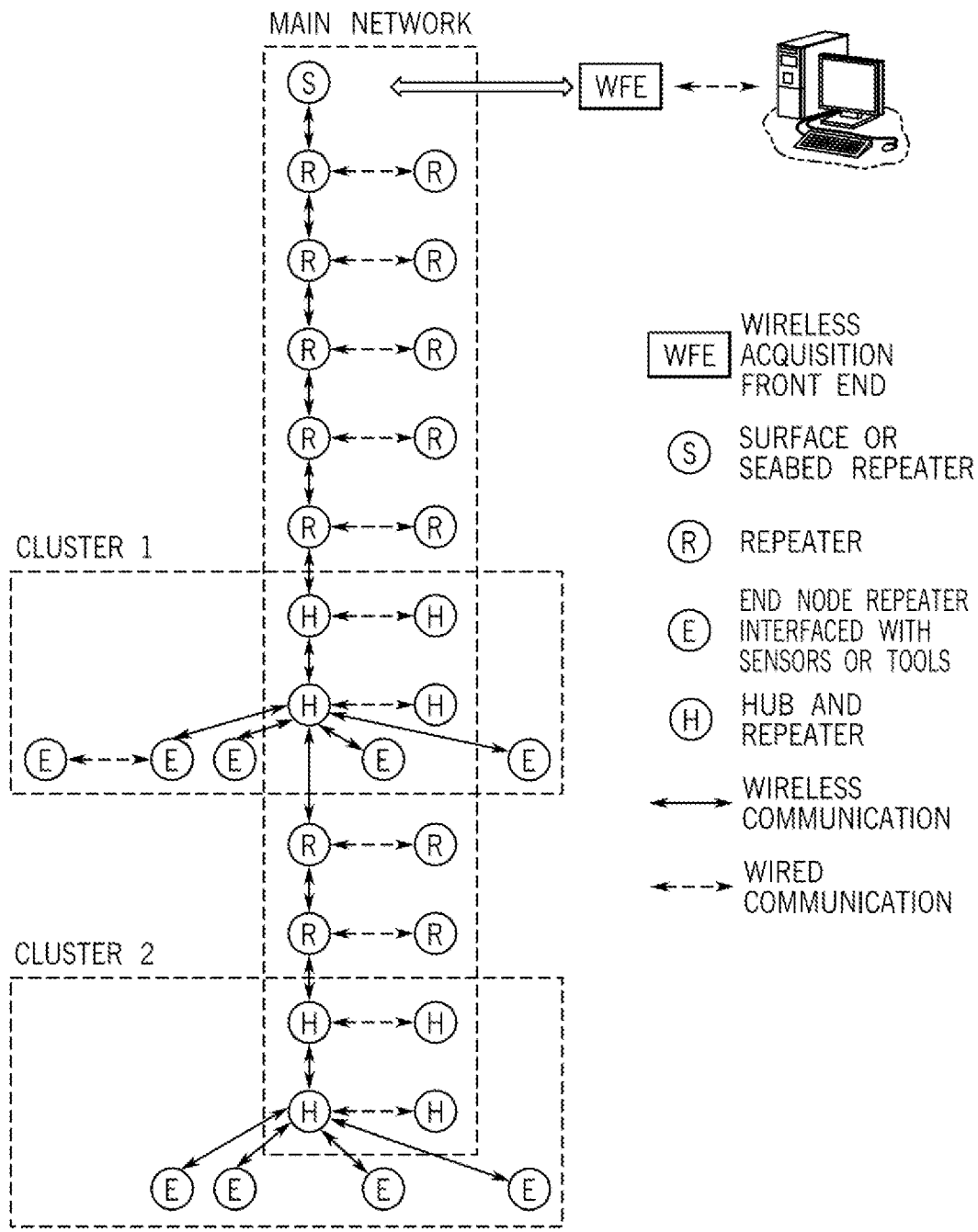
FIG. 10 shows a wireless telemetry network for well-test application, such as the Muzic Telemetry System from Schlumberger.

Wireless telemetry is now a well-established technology in the context of drill stem test (DST) operations. The most common implementation is based on acoustics using the production pipe as a communication channel. The system can include a network of repeater nodes clamped on the production pipe, such as the Muzic System provided by Schlumberger. A typical tool string is detailed in FIG. 10. Each repeater can receive and send acoustic messages. The acoustic messages generated by the nodes are then relayed from one node to another up to their final destination. The repeaters can be configured differently depending on their location and role on the string. They can be standalone downhole repeaters but can also be interfaced with downhole equipment. Most DST tools are now interfaced with wireless telemetry such as the Tester Valve (intelligent remote dual valve (IRDV) family in Schlumberger portfolio), Pressure Gauges (Signature Gauges in Schlumberger portfolio), Fluid sampler (SCAR/SLS (inline independent reservoir fluid sampling/slimline single-phase reservoir fluid sampler) in Schlumberger portfolio) and Firing Head (E-Fire in Schlumberger portfolio). The system is designed to easily interface with new devices via a digital interface. The system also includes a Surface repeater. The surface repeater is the upper most one in the acoustic telemetry system and is connected to the wireless acquisition front-end and to a dedicated computer used to control and monitor downhole equipment.

Figure 11:
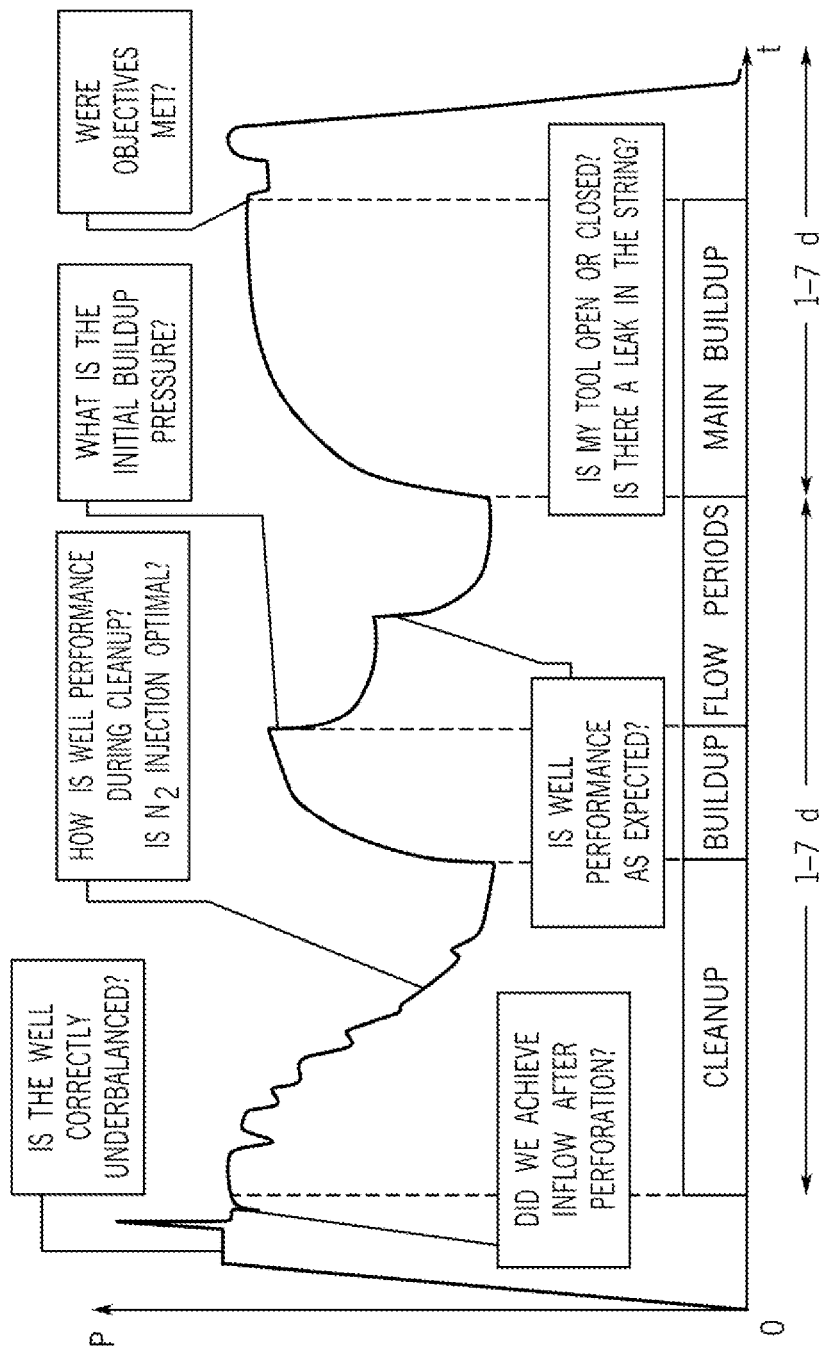
FIG. 11 shows a reservoir pressure measurement in the context of a well-test operation using typical pressure data vs. time.

One feature is the ability to acquire downhole pressure data vs. time. Depending on the tool string configuration, pressure gauges can be located in various locations. Of interest in the context of this disclosure are gauges located below the tester valve and measuring the reservoir pressure. Once the reservoir has been perforated, a well-test program will be several cycles of production followed by non-producing time (Build-Up). A typical pressure transient as measured during a well test is displayed in FIG. 11. The real-time (RT) telemetry enables these pressure data to be acquired at the surface through a dedicated computer interfaced with the telemetry system. In the context of this disclosure, the RT pressure data can be used as an input to the GSA as detailed in Step 140 of FIG. 1.

As disclosed above, the detailed procedure can be applied to either pressure data or the pressure derivative. In general, pressure data is displayed on a linear time scale; whereas, pressure derivative is computed with respect to logarithmic time and displayed on a logarithmic time scale (though delta pressure may be displayed on a logarithmic time scale with the pressure derivative for analysis purposes in some cases). For this disclosure, a wireless telemetry downhole pressure data acquisition schedule can be automatically changed so that a constant time interval is applied between each data point acquired when performing an analysis on the pressure data and a logarithmically increasing time interval is applied between each data point acquired when performing an analysis on the pressure derivative. This capability optimizes the number of data points acquired and the time required to transmit this data from downhole gauges to the surface acquisition system.

Figure 12:
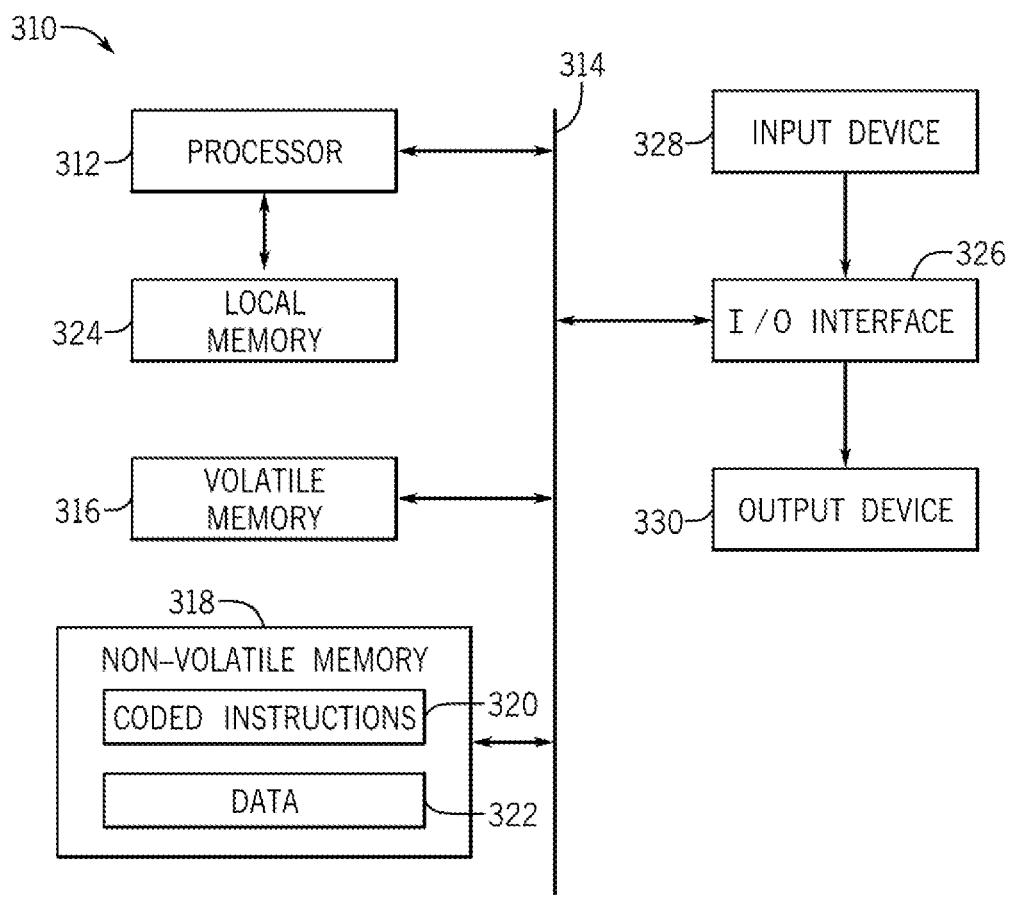
FIG. 12 is a block diagram of components of a programmed computer for performing sensitivity analysis and predicting future production of a well in accordance with one embodiment.

Skilled artisans will appreciate that a computer can be programmed to facilitate performance of the above-described processes. One example of such a computer is generally depicted in FIG. 12 in accordance with one embodiment. In this example, the computer 310 includes a processor 312 connected via a bus 314 to volatile memory 316 (e.g., random-access memory) and non-volatile memory 318 (e.g., flash memory and a read-only memory (ROM)). Coded application instructions 320 and data 322 are stored in the non-volatile memory 318. For example, the application instructions 320 can be stored in a ROM and the data 322 can be stored in a flash memory. The instructions 320 and the data 322 may also be loaded into the volatile memory 316 (or in a local memory 324 of the processor) as desired, such as to reduce latency and increase operating efficiency of the computer 310. The coded application instructions 320 can be provided as software that may be executed by the processor 312 to enable various functionalities described herein. Non-limiting examples of these functionalities include modeling of pressure response and pressure derivative in a reservoir, performing sensitivity analysis, and predicting production from a well, as described above. In at least some embodiments, the application instructions 320 are encoded in a non-transitory computer readable storage medium, such as the volatile memory 316, the non-volatile memory 318, the local memory 324, or a portable storage device (e.g., a flash drive or a compact disc).

An interface 326 of the computer 310 enables communication between the processor 312 and various input devices 328 and output devices 330. The interface 326 can include any suitable device that enables this communication, such as a modem or a serial port. In some embodiments, the input devices 328 include the wireless acquisition front end of FIG. 10 and a keyboard and a mouse to facilitate user interaction, while the output devices 330 include displays, printers, and storage devices that allow output of data received or generated by the computer 310. Input devices 328 and output devices 330 may be provided as part of the computer 310 or may be separately provided.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. A method for predicting future production from a well, the method comprising:
   obtaining pressure measurements of well fluid during a pressure transient test;
   using the obtained pressure measurements to determine, through inversion and while continuing the pressure transient test, probabilistic estimates of input parameters of a pressure transient reservoir model;
   estimating future production from the well based on the probabilistic estimates of the input parameters of the pressure transient reservoir model determined through inversion; and
   terminating the pressure transient test in response to a determination that uncertainty in the estimated future production is below a predefined threshold value.

2. The method of claim 1, wherein using the obtained pressure measurements to determine probabilistic estimates of input parameters of the pressure transient reservoir model includes using the obtained pressure measurements to update previous probabilistic estimates of input parameters of the pressure transient reservoir model.

3. The method of claim 2, comprising providing initial probabilistic estimates of input parameters of the pressure transient reservoir model before beginning the pressure transient test within the well.

4. The method of claim 1, comprising:
   using the obtained pressure measurements to iteratively update, through inversion and while continuing the pressure transient test, the probabilistic estimates of the input parameters of the pressure transient reservoir model; and
   iteratively refining an estimation of future production from the well based on the iteratively updated probabilistic estimates of the input parameters of the pressure transient reservoir model determined through inversion.

5. The method of claim 1, wherein estimating future production from the well based on the probabilistic estimates of the input parameters of the pressure transient reservoir model determined through inversion is performed during the pressure transient test.

6. The method of claim 1, wherein estimating future production from the well based on the probabilistic estimates of the input parameters of the pressure transient reservoir model determined through inversion includes using the probabilistic estimates of the input parameters of the pressure transient reservoir model determined through inversion as input parameters of a production prediction reservoir model.

7. The method of claim 1, wherein using the obtained pressure measurements to determine the probabilistic estimates of input parameters of the pressure transient reservoir model includes using the obtained pressure measurements to determine the probabilistic estimates of input parameters of the pressure transient reservoir model via inversion of an approximation of the pressure transient reservoir model.

8. The method of claim 7, comprising constructing the approximation of the pressure transient reservoir model.

9. The method of claim 8, wherein constructing the approximation of the pressure transient reservoir model includes constructing the approximation of the pressure transient reservoir model via polynomial chaos expansion or constructing a kriging-based approximation of the pressure transient reservoir model.

10. The method of claim 1, comprising performing a global sensitivity analysis to quantify contributions of uncertainty in the input parameters of the pressure transient reservoir model to uncertainty in an output of the pressure transient reservoir model, wherein performing the global sensitivity analysis includes constructing an approximation of the pressure transient reservoir model.

11. The method of claim 1, comprising:
    defining uncertain input parameters of the pressure transient reservoir model and a production prediction reservoir model;
    defining probability distributions for the uncertain input parameters;
    generating forward realizations of the pressure transient reservoir model;
    generating forward realizations of the production prediction reservoir model;
    quantifying contributions of uncertainty in the input parameters to uncertainty in a pressure transient response output of the pressure transient reservoir model;
    quantifying contributions of uncertainty in the input parameters to uncertainty in a predicted production output of the production prediction reservoir model;
    comparing the quantified contributions of uncertainty in the input parameters to uncertainty in the pressure transient response output with the quantified contributions of uncertainty in the input parameters to uncertainty in the predicted production output; and
    refining the pressure transient test to be performed within the well at the wellsite based on the comparison of the quantified contributions of uncertainty in the input parameters to the uncertainties in the pressure transient response output and the predicted production output so as to reduce uncertainty in the estimated future production.

12. The method of claim 11, wherein quantifying contributions of uncertainty in the input parameters to uncertainties in the pressure transient response output and the predicted production output includes performing global sensitivity analysis to quantify the contributions.

13. The method of claim 12, wherein performing global sensitivity analysis to quantify the contributions includes constructing approximations of the pressure transient reservoir model and the production prediction reservoir model.

14. The method of claim 11, wherein defining probability distributions for the uncertain input parameters includes using the obtained pressure measurements to determine, through inversion and while continuing the pressure transient test, probabilistic estimates of input parameters of the pressure transient reservoir model.

15. The method of claim 14, further comprising terminating the pressure transient test based on the comparison of the quantified contributions of uncertainty in the input parameters to the uncertainties in the pressure transient response output and the predicted production output if further uncertainty reduction in the estimated future production from the well is deemed unattainable from further continuing the pressure transient test.

* * * * *